UNITED STATES PATENT OFFICE.

HENRY W. MERRITT, OF BOSTON, MASSACHUSETTS, ASSIGNOR TO WILLIAM H. IRELAND, OF SAME PLACE.

PLASTIC COMPOUND FOR WALLS, &c.

SPECIFICATION forming part of Letters Patent No. 322,307, dated July 14, 1885.

Application filed May 4, 1885. (No specimens.)

*To all whom it may concern:*

Be it known that I, HENRY W. MERRITT, of Boston, in the county of Middlesex and State of Massachusetts, have invented an Improvement in a Plastic Compound for Walls, &c., of which the following description is a specification.

This invention consists of a new plastic compound which, exposed to the air, will set and become extremely hard. Such plastic compound is especially useful as a plaster for coating the walls of buildings, and it needs no hair or fibrous material intermixed therewith to make it cohere. Moreover, it can be made to adhere with great tenacity to the surfaces of wood, masonry, or glass, and thus form an enduring covering thereon.

I will first describe the best mode which I have discovered for practicing my invention, and will then explain its nature and scope.

There is known in the market a highly-silicious substance called "asbestine," which is principally a silicate of magnesium. It exists as a natural mineral deposit in St. Lawrence county, New York. Its composition has been found by analysis to be, silica, 61.23 per cent.; magnesia, 31.37 per cent.; alumina, 1.99 per cent.; iron protoxide, 0.37 per cent., and water, 5.02 per cent.; but of course the percentage of silica, magnesia, and associated substances may be expected to vary somewhat in different specimens.

I have found that when asbestine is reduced to powder and mixed with quartz-sand and caustic soda or caustic potash dissolved in water there may be formed a plastic mass which can be worked and applied like mortar, and which, when spread and exposed to the air, turns as hard as a stone without tendency to crack or crumble. For this purpose I take twenty pounds of powdered asbestine, forty pounds of quartz-sand, and one and one-half pound of caustic soda. These ingredients are then worked into a plastic mass by the use of about twenty-two pounds of water, in which the caustic alkali is first dissolved, and then the powdered asbestine and sand are introduced and thoroughly intermixed. The proportions of these ingredients here given are not absolute, but may be varied somewhat within practical limits, which will be readily understood from the explanations herein contained. The plaster adheres well enough to ordinary lathing or rough surfaces; but when it is intended to be spread upon smooth surfaces I find that a small proportion of soluble silicate of soda may be advantageously introduced to make the mass more adhesive. For this latter purpose I find that about three and one-half pounds of the soluble alkaline silicate in the mass already specified is sufficient. Chemically considered, it appears that this stone-like plaster results from a combination effected between the silicate of magnesium and the sand (silica) by the agency of the caustic alkali after these ingredients are brought together and incorporated in the presence of water. I have found that various solid silicates in a pulverized state possess this capability of combination with comminuted silica by means of fixed caustic alkali—*i. e.*, caustic soda or caustic potash—dissolved in water sufficient to enable the dry ingredients, when thoroughly intermixed therewith, to form a plastic mass. Of these I may mention other silicates of magnesium and also silicates of magnesium and aluminum, silicates of aluminum, silicates of calcium, and, in general, solid silicates of simple or compound bases, more particularly those silicates which are highly silicious. Such solid silicates are insoluble in water.

Among the natural silicates existing as mineral deposits I have tried as substitutes for asbestine various other substances—such as serpentine, soapstone, and asbestus—and I have found them to answer the purpose measurably well. The solid silicates of other bases appear to be for this purpose inferior to the silicates of magnesium; but for the sake of economy fairly good results may be attained by mixing such other silicates with asbestine; nor need the sand used be pure silica, although it must be silicious, and it will be chemically effective only by reason of the silica present in it. Thus infusorial earth and even coal-ashes may be substituted for sand or intermixed therewith, and useful, although inferior, results be attained; but this will rarely be done on account of the abundance of good quartz-sand.

From what I have said it will be understood that along with the effective ingredients of my plastic compound—to wit, silicate of magnesium or other highly silicious solid silicate in a pulverized state, quartz-sand or comminuted silica and fixed caustic alkali, either with or without a soluble alkaline silicate—there may be associated either chemically or mechanically other substances in quantities more or less considerable without practical detriment to the resulting stone-like material obtained by exposure of such plastic compound to the air. Nevertheless, I do not recommend the use of such foreign substances nor of the inferior substitutes for asbestine and sand to which I have referred. I have mentioned them only to illustrate the scope of my invention, and to show that its benefits may be measurably attained even when it is not practiced most advantageously. I have also found that all the ingredients of my new plastic compound except the sand may be mixed together and kept for future use at the places where it may be convenient to add the sand. This mixture of pulverized solid silicate, fixed alkali, and water, either with or without a proportion of soluble alkaline silicate, can be put in barrels and transported, ready for the addition of the sand, wherever it may be desired to make the plastic compound which is to harden into artificial stone. Such mixture of itself is new, and it is part of my invention to prepare it separately for subsequent use with comminuted silica to form my new plastic compound.

I claim—

1. A plastic compound containing as ingredients silica and a solid silicate, each in comminuted or pulverized condition, and fixed caustic alkali dissolved in water, the whole being intermixed and incorporated substantially as described.

2. A plastic compound consisting of silica and a solid silicate, each in comminuted or pulverized condition, fixed caustic alkali dissolved in water, and a soluble alkaline silicate, the whole being intermixed and incorporated substantially in the manner and for the purpose set forth.

3. A plastic compound containing as ingredients comminuted silica, a solid silicate of magnesium in pulverized state, and fixed caustic alkali dissolved in water, substantially as described.

4. A plastic compound consisting of quartz-sand, pulverized asbestine, and caustic soda or caustic potash, with water to dissolve the alkali and give plasticity to the mass.

5. A plastic compound consisting of quartz-sand, pulverized asbestine, caustic soda or caustic potash, and a soluble alkaline silicate, with water to dissolve the soluble ingredients and render the mass suitably plastic.

6. A mixture of pulverized solid silicate, fixed alkali, and water, either with or without a proportion of soluble alkaline silicate, ready for subsequent addition of sand to form a plastic compound, substantially as described.

In testimony whereof I have signed my name to this specification in the presence of two subscribing witnesses.

HENRY W. MERRITT.

Witnesses:
 GEO. W. GREGORY,
 WM. CARLTON IRELAND.